United States Patent [19]

Turpin

[11] Patent Number: 4,845,906

[45] Date of Patent: Jul. 11, 1989

[54] FUNERAL VAULT

[76] Inventor: Rowland A. Turpin, Rte. 1, Romance, Ark. 72136

[21] Appl. No.: 193,140

[22] Filed: May 6, 1988

Related U.S. Application Data

[63] Continuation of Ser. No. 935,706, Nov. 23, 1986, abandoned, and a continuation-in-part of Ser. No. 879,591, Jun. 27, 1986, abandoned.

[51] Int. Cl.⁴ ............................................ C04H 13/00

[52] U.S. Cl. ................................ 52/124.2; 52/124.1; 27/2

[58] Field of Search .................... 52/128, 124.1, 124.2, 52/125.2, 125.3; 27/2, 32, 26, 30, 5

[56] References Cited

U.S. PATENT DOCUMENTS

| | | | |
|---|---|---|---|
| 3,208,188 | 9/1965 | Fulton et al. | 52/124.2 X |
| 4,154,031 | 5/1979 | Williamson, Jr. | 52/124.1 |
| 4,253,220 | 3/1981 | Work | 27/2 X |

*Primary Examiner*—David A. Scherbel
*Assistant Examiner*—Creighton Smith
*Attorney, Agent, or Firm*—Beveridge, DeGrandi & Weilacher

[57] ABSTRACT

A two piece burial vault comprised of a cooperating pair of high density, molded polystyrene members which are adapted to be frictionally, foricibly coupled together to surround, seal and enclose a conventional casket. A lower generally planar base unit supports the coffin or casket, and an upper dome-like enclosure is adapted to be frictionally coupled to the lower base and forcibly maintained in relation therewith by the subsequent compressive force of accumulated dirt after burying of the vault. The base includes an inner surface from which a pair of upwardly projecting ridges emanate for supporting the casket. The sides and edges of the base are appropriately angled, for frictional interfitting with similarly configured internal edges of the dome. The base includes a downwardly projecting centered deck adapted to contact the lower surface of the grave, which is bordered by a pair of offset ledges which are adapted to receive and facilitate the use of conventional vault lowering straps. The lowering straps will not be inconveniently forced into abutment with either the bottom or sides of the grave when the apparatus is subsequently lowered into the ground. The higher density dome includes a top, a pair of spaced apart, inclined integral ends, and integral sides, all of which are inclined so as to sealably engage the cooperating inclined outer edge portions of the base. Preferably the inclination of the working surfaces of the dome is less extreme than the inclination of the working surfaces of the base. A grid-like series of reinforcement ribs disposed in a waffle like pattern prevents deformation, and a plurality of conveniently accessible handles molded into the base facilitate maneuvering of the vault.

35 Claims, 6 Drawing Sheets

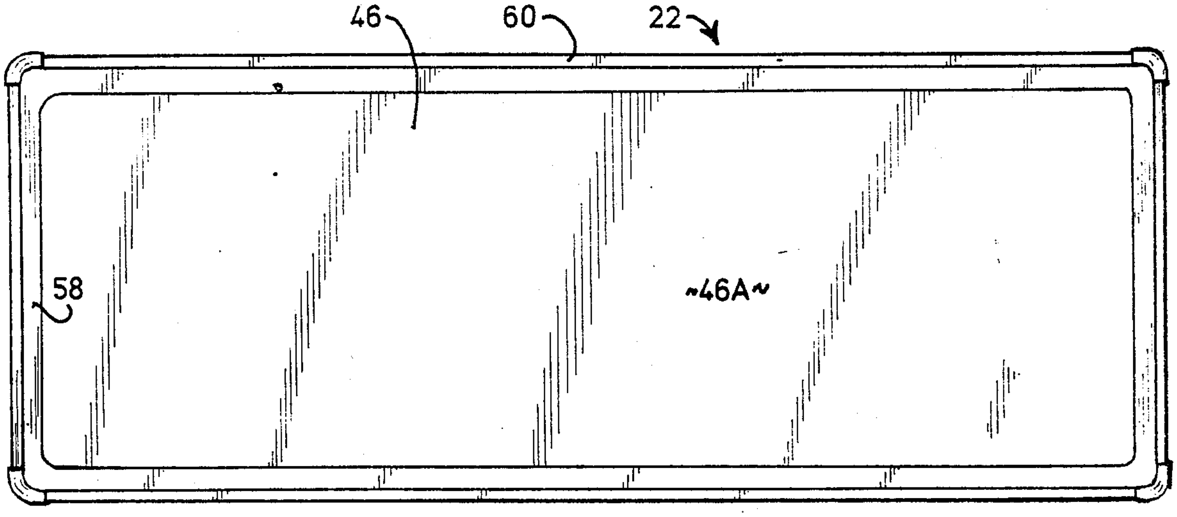
FIG. 7
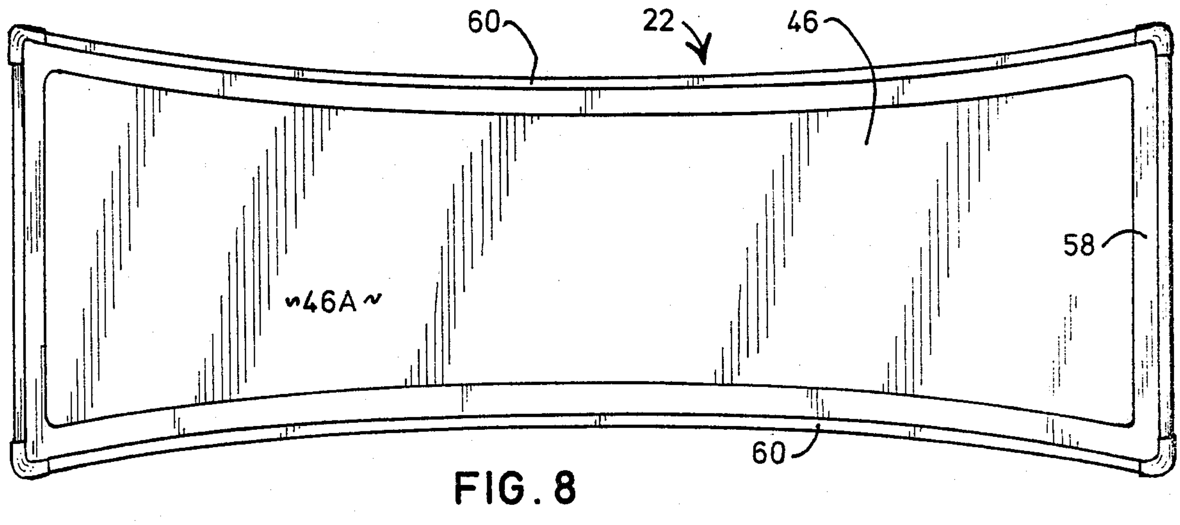
FIG. 8
FIG. 9
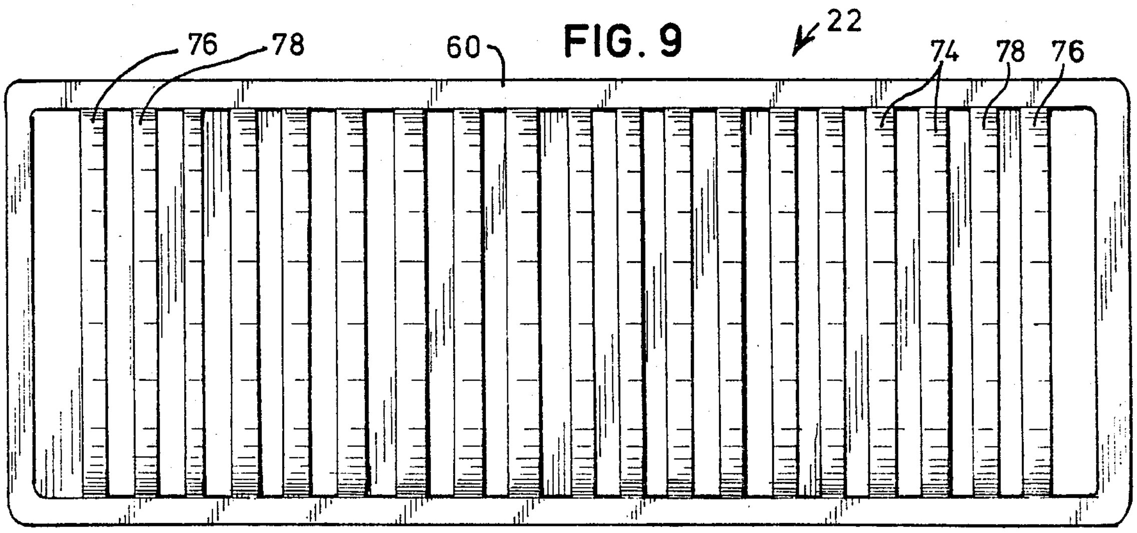

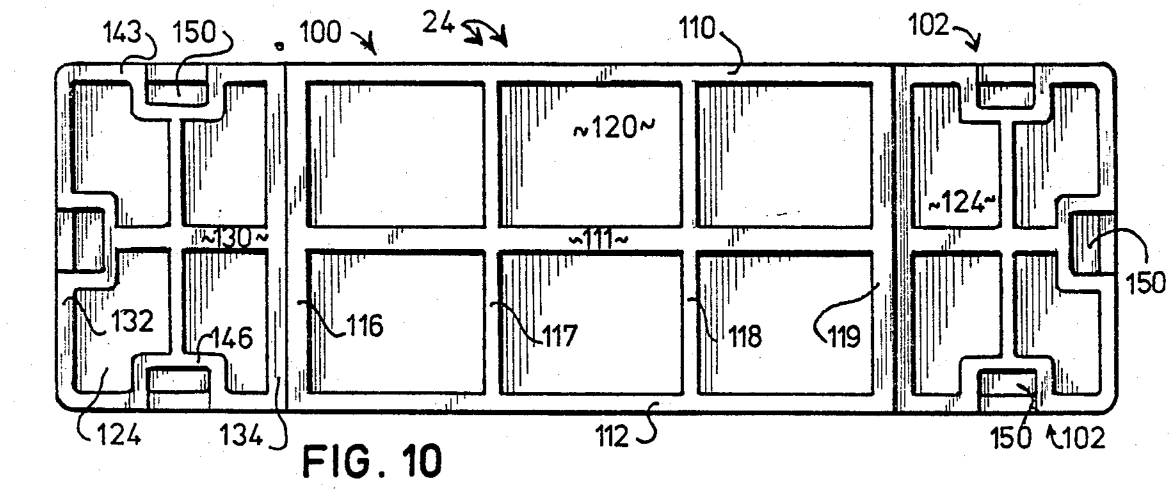
FIG. 10
FIG. 11
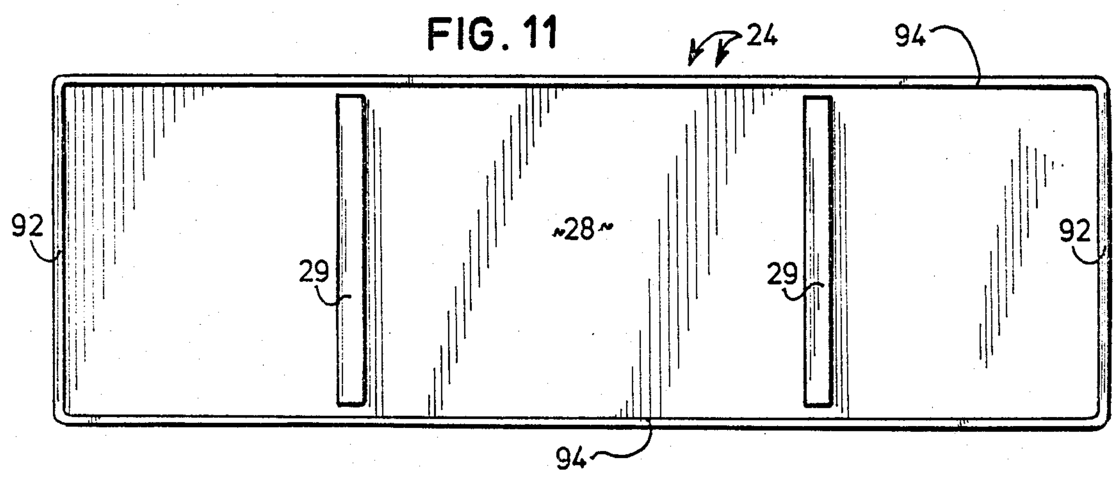
FIG. 12
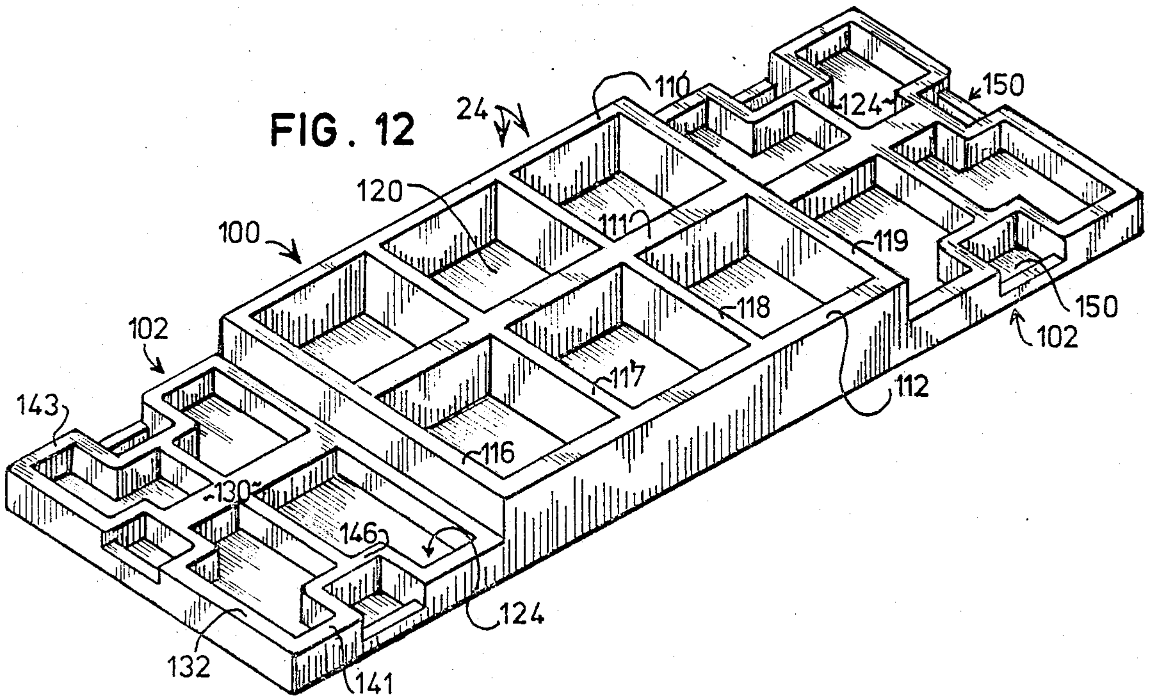

FUNERAL VAULT

CROSS-REFERENCE TO RELATED APPLICATION

The present application is a continuation of Ser. No. 06/935,706 filed Nov. 23, 1986, now abandoned, and is a Continuation-in-Part of the previously filed parent application, Ser. No. 06/879,591, filed by the same applicant herein, Rowland A. Turpin, on June 27, 1986 and entitled BURIAL VAULT, now abandoned.

BACKGROUND OF THE INVENTION

The present invention relates generally to burial vaults. More particularly the present invention is directed to a two piece polystyrene burial vault adapted to compressively surround and seal an internally disposed casket during and after the burial process. The invention is believed best classified in United States Class 52, subclass 138.

The known prior art reveals a plurality of burial vaults comprising one or more cooperative parts which are adapted to be fitted together. Burial vaults exist of the "air seal" type are adapted to provide a seal for enclosing the interiorly disposed casket. Air seal type burial vaults comprised of molded synthetic plastic "resinous" materials are also well known in the art. However, their sealing ability is in question and their strength has been shown to be inadequate.

U.S. Pat. No. 235,376, issued to Orr on Dec. 14, 1880 discloses a multi-piece coffin in which a top section is adapted to be placed on a lower containment section and in which the lower section includes offset shoulders for receiving the straps of the conventional burial lowering device. Work Patent 4,253,220, issued on Mar. 3, 1981, discloses a burial vault in which a lower container is adapted to receive a coffin to be disposed therewithin, and an upper top is fitted to the lower container. However, compression of the top against the lower base does not provide an air tight or water tight seal which simultaneously pressurizes the interior of the vault after burying, and which inherently resists the corrosive effects of water and the like.

A mausoleum device is shown in U.S. Pat. No. 1,466,725, issued Sept. 4, 1923 to McMeans. This invention discloses a lower base having a plurality of spaced apart tapered extensions rising upwardly from the floor of the base for supporting in elevated disposition an internally disposed casket. An upper cover is placed over the casket and the base but no operationally effective seal is provided by the action of the cover upon the base.

Perhaps the most pertinent prior art known to applicant is disclosed in United States Patents U.S. Pat. Nos. 3,208,186 and 3,208,188 issued to B. A. Fulton on Sept. 28, 1965. Of these patents, U.S. Pat. No. 3,208,188 is most germane. It discloses a lower base adapted to be lowered into the ground, and which receives an upper, box-like cover adapted to be fitted to the outer peripheral edges of the base member. A plurality of internally disposed reinforcing ribs are associated with the interior surface of the cover.

However, to my knowledge there has never been either a burial vault or casket comprised of polystyrene because it has hitherto been believed that such material is not strong enough for the intended purpose. Moreover, it is not believed to be known in the art to provide a two piece burial vault of the air seal type in which subsequent pressure provided by the accumulated dirt disposed within the grave urges the two members together in such a fashion so as to continuously maintain an internal seal.

In particular, it would seem advantageous to provide a resilient two piece air seal burial vault system in which the interior, in which the casket is disposed, becomes pressurized by slight deformation of the top in compression thereof against the bottom. It would also seem desirable to provide an overall configuration in which the geometry of the various parts aids in strengthening the overall combination to enable the successful use of polystyrene molded components.

SUMMARY OF THE INVENTION

The present invention comprises a two piece burial vault comprised of a cooperating pair of high density, molded polystyrene members which are adapted to be frictionally, forcibly coupled together to surround, seal and enclose a conventional casket. Preferably the invention comprises a lower base unit which supports the coffin or casket, and an upper domelike enclosure adapted to be frictionally coupled to the lower base and forcibly maintained in relation therewith by the subsequent compressive force of accumulated dirt after burying of the vault.

The generally rectangular base preferably includes an inner surface from which a pair of upwardly projecting ridges emanate, and which support the casket. The sides and edges of the base are appropriately angled, for frictional interfitting with similarly configured internal edges of the dome. Preferably the base is molded from high density polystyrene, and it includes a lower, downwardly projecting and centered deck adapted to contact the lower surface of the grave, which is bordered by a pair of spaced apart offset ledges disposed on either side of the deck. These ledges are adapted to receive and facilitate the use of conventional vault lowering straps, and through the construction disclosed, the straps will not be inconveniently forced into abutment with either the bottom or sides of the grave when the apparatus is subsequently lowered into the ground.

The molded polystyrene dome is adapted to be frictionally coupled to the base. It includes an upper top and a pair of spaced apart, inclined integral ends and associated inclined integral sides. The inner surfaces of the ends and sides are all inclined appropriately so as to cooperate and frictionally sealably engage the cooperating inclined outer edges or shoulders of the base. Preferably the inclination of the working surfaces of the dome is less extreme than the inclination of the working surfaces of the base. In the best mode the inclined sides and ends of the dome are angled at approximately 3 degrees, whereas the base inclination is preferably 3.5 degrees.

Once the burial vault is fitted about the internally disposed casket, the composite unit may be lowered into the ground through conventional lowering straps associated with a conventional casket lowering device. After lowering, the straps may be conveniently dislodged from the receptive ledges aforedescribed without interfering contact with either the lower grave surface or the grave walls. When dirt is piled upon the vault during burying, compressive forces generated thereby will seal the vault as the resilient dome will be compressed and bent somewhat. However, force distributing ribs disposed internally within the upper confines of the dome distribute force against the casket and resist total deformation. As slight deformation occurs, however, the interior of the vault will be somewhat pressurized so as to prevent the subsequent admission of liquids and the like.

Through the preferred base geometry, the grid like series of reinforcement ribs disclosed prevents base deformation, and a plurality of conveniently accessible handles are also molded into the base to facilitate maneuvering of the vault.

Thus a primary object of the present invention is to provide a two piece molded polystyrene burial vault.

Yet another object of the present invention is to provide a polystyrene burial vault of the character described of the air sealed type.

Another similar object of the present invention is to provide an air seal polystyrene burial vault adapted to pressurize the interior to prevent the ommission or accumulation of unwanted water.

A fundamental object of the present invention is to provide an improved, insulated funeral vault which is adapted to prevent fluid seepage.

A similar broad object of the present invention is to provide a funeral vault of the character described which is internally pressurized.

Another similar object of the present invention is to provide a funeral vault of the character described which includes an improved sliding seal.

Another broad object of the present invention is to provide an improved funeral vault constructed of expanded polystyrene of a specific density.

Yet another object of the present invention is to provide a funeral vault of the nature described which includes an improved base member.

Yet another object of the present invention is to provide an improved funeral vault which includes a solid molded air and water locking base and is adapted to be molded in one piece.

Still another object of the present invention is to provide a vault of the character described which facilitates the removal of conventional lowering straps after use.

A further object of the present invention is to provide an improved funeral vault which incorporates a one-piece molded dome structurally supported by integrally molded ribs.

A similar object of the present invention is to provide a funeral vault of the nature described which is adapted to rest and be supported upon the sides and top of the interiorly disposed casket.

Yet another object of the present invention is to provide a funeral vault which can be conveniently lowered by means of conventional lowering straps into the burial site with the casket sealably encased.

Still another object of the present invention is to provide a method for manufacturing an improved funeral vault of the nature described.

Yet a further object of the present invention is to provide an improved funeral vault which is structurally adapted to provide an air-tight, water-tight seal which obviates the use of additional sealants.

A still further object is to provide a burial vault of the character described equipped with reinforcement compartments and cooperating ribbed structure to brace the apparatus, which cooperate to minimize the required volume of constituent polystyrene.

A related object of the present invention is to provide a funeral vault of the character described which seals more tightly as greater weights of burial earth are applied.

Another object of the present invention is to provide an improved funeral vault which resists corrosion and accumulation of water and which does not permit the formation of water condensation.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 7 is an enlarged top plan view of the dome of the present burial vault;

FIG. 8 is an enlarged bottom plan view of the dome of FIG. 7, with the side walls thereof greatly distorted by exaggeration of the angles thereof for purposes of explanation;

FIG. 9 is an enlarged interior plan view illustrating the internal roof of the base;

FIG. 10 is a bottom plan view of the base;

FIG. 11 is an interior top plan view of the base;

FIG. 12 is a bottom perspective view of the preferred base;

DETAILED DESCRIPTION

Figure 3:
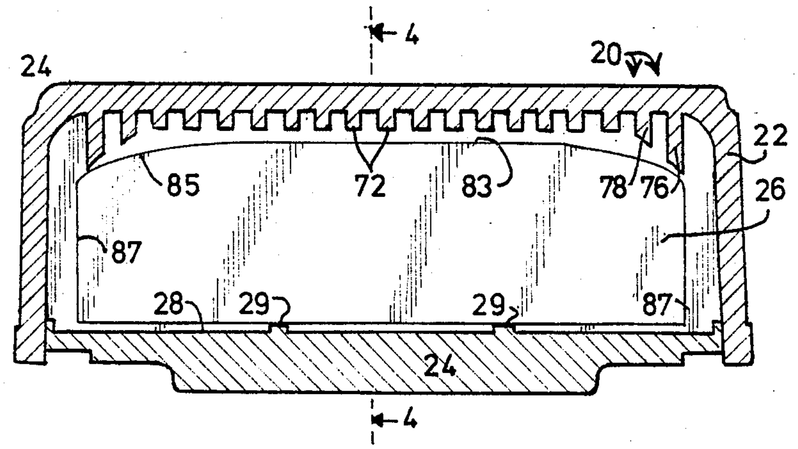
FIG. 3 is a longitudinal sectional view thereof.
Figure 4:
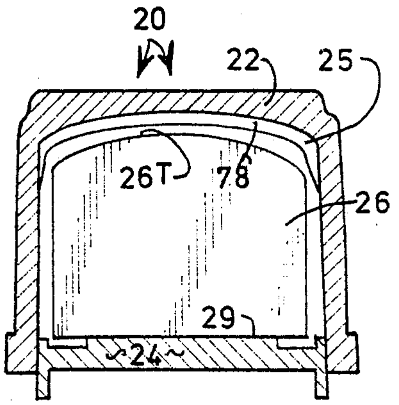
FIG. 4 is an end sectional view taken generally along line 4—4 of FIG. 3.
Figure 5:
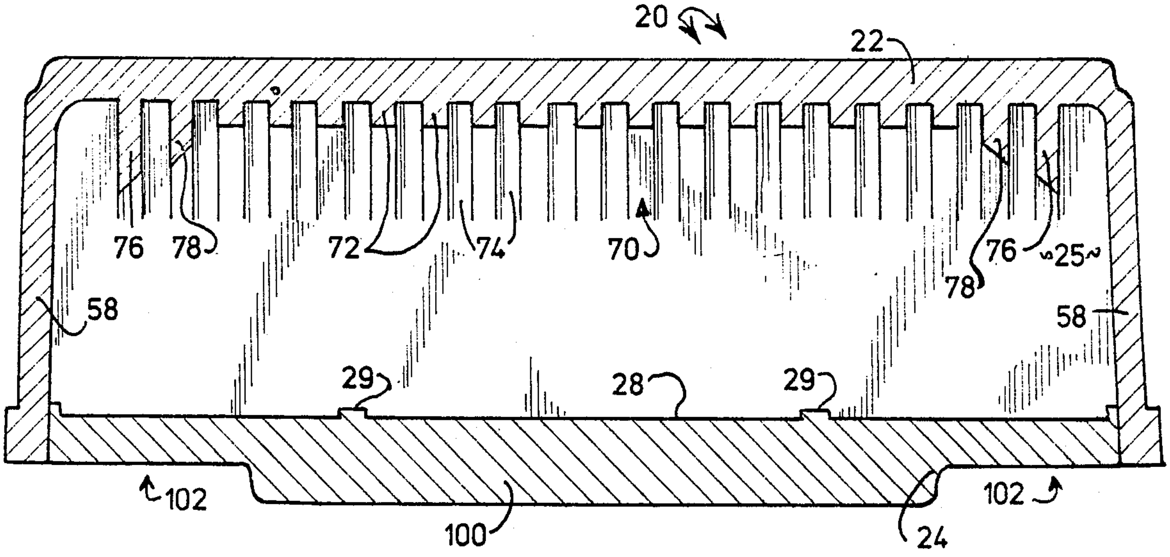
FIG. 5 is an enlarged longitudinal sectional view thereof, with the casket omitted.
Figure 6:
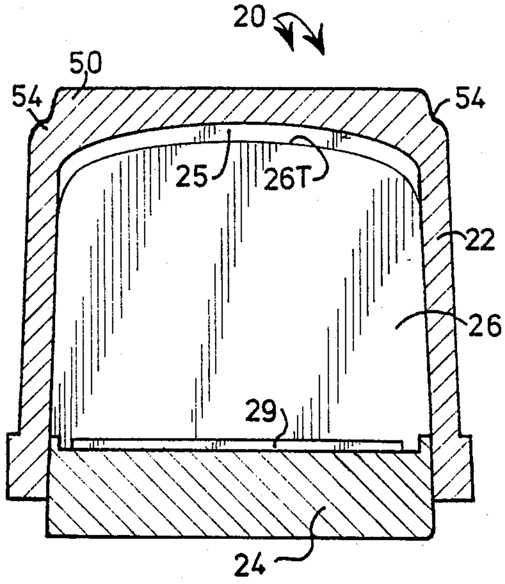
FIG. 6 is an enlarged vertical sectional view thereof.

With initial reference now directed to FIGS. 1–4 of the appended drawings, a molded polystyrene two-piece burial vault constructed in accordance with the best mode of the present invention has been generally designated by the reference numeral 20. The vault 20 comprises an upper, generally cubical dome, generally designated by the reference numeral 22, and a lower generally planar base member generally designated by the reference numeral 24. As seen in FIGS. 3 and 4 the vault 20 is adapted to sealably confine and enclose a conventional casket 26 which is disposed upon spaced apart elevated ledges 29 rising upwardly from the upper interior planar surface 28 of the base member 24.

Figure 1:
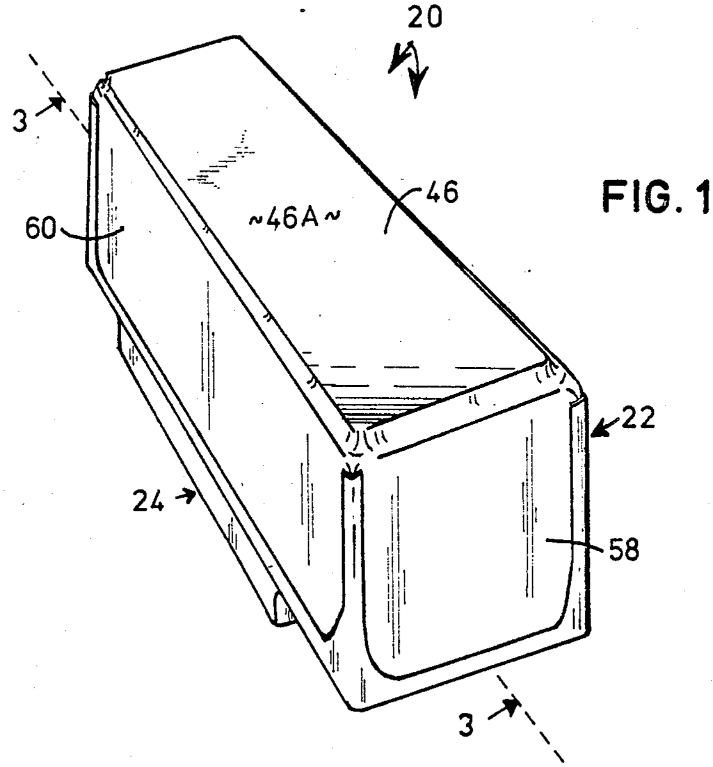
FIG. 1 is a perspective view of the assembled burial vault constructed in accordance with the best mode of the present invention.
Figure 2:
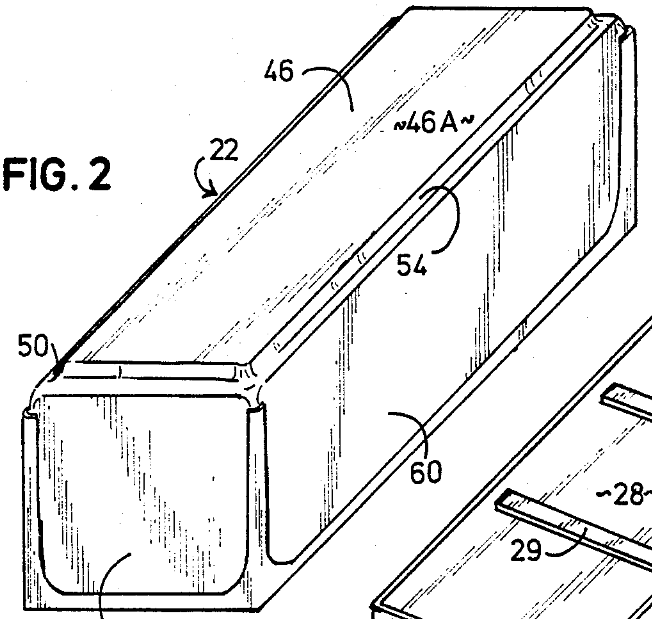
FIG. 2 is a perspective view of the dome portion.
Figure 2A:
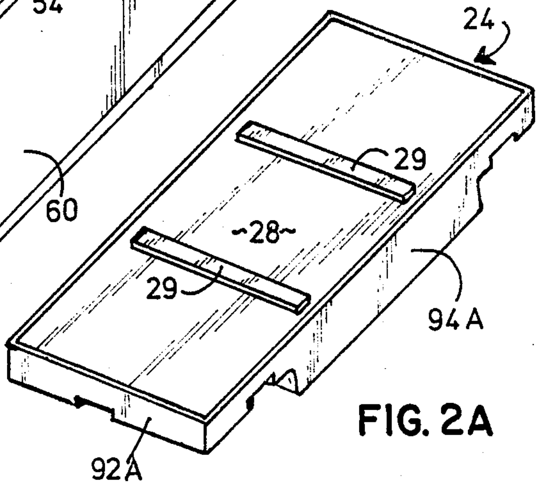
FIG. 2A is a perspective view of the base portion thereof.
Figure 1A:
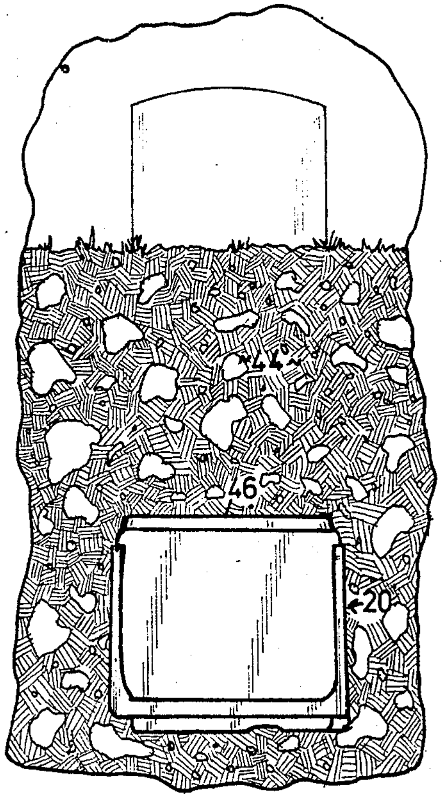
FIG. 1A is a fragmentary pictorial view illustrating the burial vault of the present invention after it has been installed.
Figure 1B:
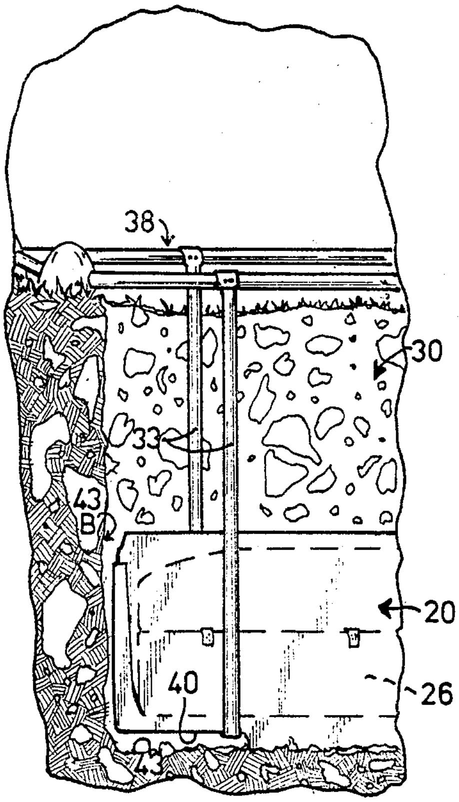
FIG. 1B is a fragmentary pictorial view illustrating the lowering of the composite vault and casket into the grave by the straps associated with a conventional lowering device.

As will be explained in detail hereinafter, vault 20 is adapted to be lowered within a suitable grave 30 by a pair of straps, such as strap 33 (FIG. 1B) which are lowered by a conventional above-ground lowering machine generally indicated by the reference numeral 38. Straps 33 are adapted to be operationally disposed within suitable recessed ridges 40 to be hereinafter described so that the straps may be easily removed from the vault 20 after installation.

After the grave is packed after the burial process, earth and dirt, generally indicated by the reference numeral 44 (FIG. 1A) will develop pressure upon the top surface 46 of the dome 22, resulting in forcible sealing of the vault and compression of the dome 22 upon the base 24. The interior of the vault has been designated by the reference numeral 25. lower base 24 is divided into a central downwardly projecting deck 100 which is separated from the base ends by recessed ledges generally designated by the reference numeral 102. These ledges 102 permit the installation of strap 33 (FIG. 1B) to clear the ground surface 43 and the edge 43B during removal of the straps after lowering of the vault 20.

With reference to FIGS. 10 and 12, the base 24 is preferably reinforced through a plurality of grid-like structures of generally cubicle dimensions. For example, the lower deck 100 includes a plurality of reinforcing rails 110, 111, and 112 which are parallel and which extend between similar cooperating rails 116–119. It will be appreciated that a plurality of voids generally designated by reference numeral 120 are formed therebetween. Similarly, a plurality of voids 124 are formed within the ledge portions broadly designated by the reference numeral 102. Thus each ledge portion 102 includes a central rib 130 extending between a transverse reinforcement rib 132 and a similar rib 134. The outer zig-zagged reinforcing ribs 141 and 143 of the ledge structure includes central portions 146 which are recessed as shown to define receptive handles which are generally designated by the reference numeral 150. Handle structures 150 are generally in the form of small cubicles which permit manual grasping for purposes of manipulating the apparatus.

Figure 13:
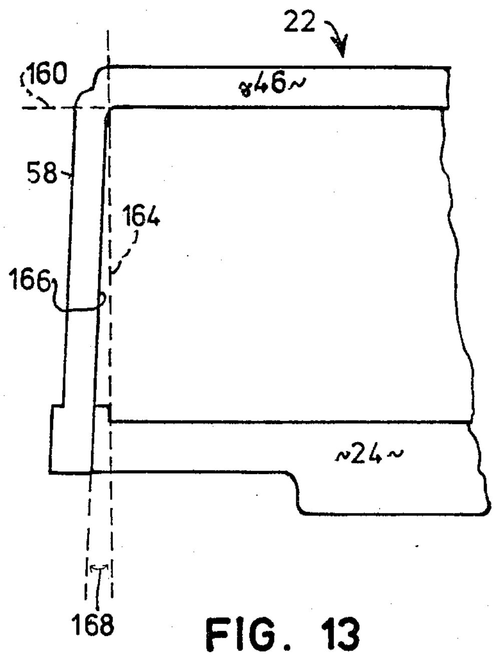
FIG. 13 is a fragmentary pictorial sectional view of a portion of the dome illustrating the taper of various walls and surfaces thereof; and, FIG. 14 is a fragmentary pictorial sectional view of a lower portion of the base.
Figure 14:
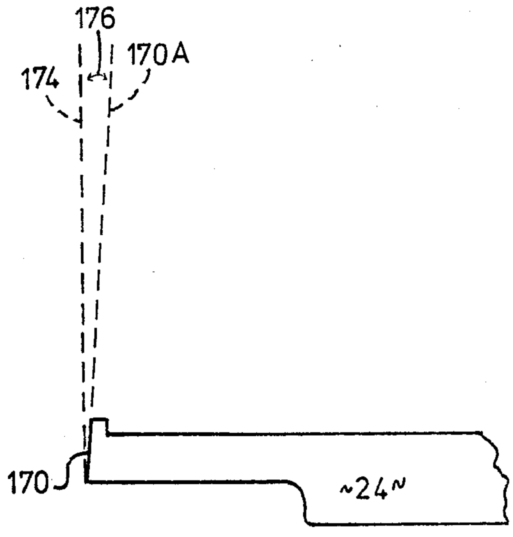

With reference now to FIGS. 13 and 14, the dome 22 includes inclined internal end surfaces and inclined internal side surfaces, both of which are inclined as shown in exaggerated form in FIG. 13. The horizontal has been generally indicated by the reference numeral 160, which line is perpendicular to the line 164 thereshown. Internal surfaces such as surface 166 form an angle 168 with respect to the perpendicular, and this incline is responsible for the wedging apart of the surfaces of the dome during frictional or forcible frictional contact interfitting with the base.

With reference to FIG. 14, the outer surfaces of the sides and ends of the base 24 such as surface 170 are inclined with respect to the perpendicular as indicated by line 174. Thus projected line 170A (FIG. 14) generates an angle 176 with respect to the vertical line 174. In the best mode the first predetermined angle 176 is greater than the second predetermined angle 168, and it has been found best if angle 176 is greater by at least ½ degree. In the best mode angle 176 is approximately 3½ degrees and angle 168 is approximately 3 degrees.

When the casket vault is lowered into the grave, subsequent filling of dirt will contact upper crown surface 46A, causing slight compression of the top of the dome. When this occurs the previously described reinforcement ribs 72, 76 and 78 may be forced downwardly into possible abutting contact with the tops 26T of the casket. Also, the inner surfaces such as surfaces 166 of the dome will be frictionally forced into contact with the similar outer surfaces 170 of the base. Because of the difference in angles 168 and 176 described previously (FIGS. 13, 14) the apparatus will forcibly seal upon assembly. The inside 25 of the vault 20 will thus be slightly pressurized, to prevent the unwanted omission of liquids such as water and the like. In addition, the insulating high density polystyrene material of which the dome and base are comprised will resist intrusion of unwanted liquids.

Furthermore, with reference to FIG. 8, it is preferred that the side walls 60 of the dome be arched or curved slightly towards each other. This is shown in greatly exaggerated form in FIG. 8, and the center most portion of the dome walls will thus maintain pressure against the abutting sides of the base.

In the best mode, the base will be approximately eight inches thick at its thickest point and four inches thick above the lowering-strap removal ledges. The density of the dome is preferably two pounds per cubic foot; the base density is one pound of polystyrene per cubic foot.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A two-piece burial vault adapted to enclose and seal a casket to be disposed therewithin, said vault and the casket adapted to be lowered into a grave for subsequent burial, said burial vault comprising:

- a resilient, generally rectangular molded base adapted to support said casket, said base having a first predetermined density, and said base comprising:
  - a pair of inclined, spaced-apart ends and a pair of inclined spaced-apart sides, said ends and said sides having outer peripheral surface portions sloped at a first predetermined angle;
  - a central supportive bottom deck adapted to contact the lower surface of the grave, and a pair of spaced-apart, offset receptive ledges defined between said deck and said base ends adapted to receive suitable lowering straps for readily permitting the lowering of said vault into said grave and for subsequently permitting the easy removal of said straps from said vault;
- a resilient molded dome of a second predetermined density which is of a greater density than that of said first predetermined density for said base member, said dome adapted to be compressively fitted to said base to enclose said casket, and said dome comprising:
  - a generally rectangular top, a pair of inclined spaced-apart sides and a pair of integral inclined spaced-apart ends, said sides having inner surfaces sloped at a second predetermined angle and adapted to frictionally sealably contact said outer surface portions of said base sides;

whereby, after said dome is fitted to said base and burial commences, the casket disposed within said vault will be sealed within the vault as the dome is compressed into said base, said dome will be slightly deform by said base and compressively mate with said base, the interior of said vault will thus be slightly pressurized, and said internally spaced apart dome ribs will be urged into contact with the top surface of the casket.

2. The burial vault as defined in claim 1 wherein said first predetermined angle is greater than said second predetermined angle.

3. The burial vault as defined in claim 2 wherein said first predetermined angle is approximately three and one half degrees and said second predetermined angle is approximately three degrees.

4. The burial vault as defined in claim 1 wherein said base has an internal reinforcement rib structure which includes ribs disposed generally in a grid-like pattern, and a plurality of handle recesses integrally associated with said rib structure for facilitating manual manipulation of said vault.

5. The burial vault as defined in claim 1 wherein said first predetermined density is approximately half the density of said second predetermined density.

6. The burial vault as defined in claim 5 wherein the density of said dome is approximately two pounds per cubic foot and the density of said base is approximately one pound per cubic foot.

7. A self sealing two piece burial vault adapted to enclose a casket, said vault and the casket disposed therewithin adapted to be lowered into a grave and subsequently buried, said burial vault comprising:

a resilient, substantially planar polystyrene base adapted to support said casket, said base molded at a first predetermined density, said base comprising:

an inner lower surface for receiving said casket;

a pair of inclined, spaced-apart ends and a pair of inclined spaced-apart sides surrounding said lower surface;

said ends and said sides having outer surface portions sloped at a first predetermined angle;

an integral, downwardly projecting bottom deck adapted to contact the lower surface of said grave; and, a pair of spaced apart, offset receptive ledges disposed between said deck and said base ends and adapted to be contacted by suitable conventional lowering straps for readily permitting the lowering of said vault into said grave and for subsequently permitting the easy removal of said straps from said vault; and, a resilient polystyrene dome adapted to be fitted to said base to enclose said casket, said dome molded at a second predetermined density and comprising a top, a pair of inclined spaced-apart sides and a pair of inclined spaced-apart ends, said sides having inner surfaces sloped at a second predetermined angle and adapted to frictionally sealably contact said outer surface portions of said base sides, and said dome ends having inner surfaces also sloped at said second predetermined angle to frictionally sealably contact said outer surface portions of said base ends when the dome is fitted to said base;

said second predetermined density being greater than said first predetermined density, and said first predetermined angle being greater than said second predetermined angle;

whereby, after said dome is fitted to said base and burial commences, the casket disposed within said vault will be sealed within the vault as the dome is compressed into said base, said dome will be slightly deform by said base and compressively mate with said base, and the interior of said vault will thus be slightly pressurized.

8. The burial vault as defined in claim 7 wherein said dome comprises a plurality of internally spaced apart, upper ribs adapted to be urged downwardly into contact with the top surface of the casket in response to compressive forces during burial.

9. The burial vault as defined in claim 8 including a pair of integral spaced apart casket-supporting offset ridges projecting upwardly from said base lower internal surface for distributing force, said ridges being substantially aligned with the outermost ends of said lower base deck.

10. The burial vault as defined in claim 7 wherein said base comprises a plurality of lower reinforcing ribs disposed generally in a grid-like pattern, and a plurality of handle recesses are integrally associated with said ribs to facilitate manual manipulation of the burial vault.

11. The burial vault as defined in claim 10 wherein the density of said dome is approximately twice the density of said base.

12. The burial vault as defined in claim 11 wherein the density of said dome is approximately two pounds per cubic foot and the density of said base is approximately one pound per cubic foot.

13. The burial vault as defined in claim 7 wherein said first predetermined angle is approximately one half degree greater than said second predetermined angle.

14. The burial vault as defined in claim 13 wherein said first predetermined angle is approximately three and one half degrees and said second predetermined angle is approximately three degrees.

15. A self sealing two piece high density polystyrene burial vault adapted to enclose a casket, said vault and the casket disposed therewithin adapted to be lowered into a grave and subsequently buried, said burial vault comprising:

a resilient, substantially planar base adapted to support said casket said base comprising:

an inner lower surface for receiving said casket, said inner surface comprising spaced apart offset casket supporting ridges projecting upwardly from said base for distributing force;

a pair of inclined, spaced-apart ends and a pair of inclined spaced-apart sides surrounding said lower surface and sloped at a first predetermined angle;

an integral, downwardly projecting bottom deck adapted to contact the lower surface of said grave; and, a plurality of lower reinforcing ribs disposed generally in a grid-like pattern, and a plurality of handle recesses integrally associated with said ribs to facilitate manual manipulation of the burial vault;

a pair of spaced apart, offset receptive ledges disposed between said deck and said base ends and adapted to be contacted by suitable conventional lowering straps for readily permitting the lowering of said vault into said grave and for subsequently permitting the easy removal of said straps from said vault;

a resilient polystyrene dome adapted to be fitted to said base to enclosed said casket, said dome comprising a top, a pair of inclined spaced-apart sides and a pair of inclined spaced-apart ends both sloped at a second predetermined angle and mate with said base when the dome is fitted to said base, and a plurality of internally spaced apart, upper ribs adapted to be urged downwardly into contact with the top surface of the casket in response to compressive forces during burial;

said dome density being greater than said base density, and said first predetermined angle being greater than said second predetermined angle;

whereby, after said dome is fitted to said base and burial commences, the casket disposed within said vault will be sealed within the vault as the dome is compressed into said base, said dome will be slightly deform by said base and compressively mate with said base, the interior of said vault will thus be slightly pressurized, and said internally spaced apart dome ribs will be urged into contact the top surface of the casket.

16. The burial vault as defined in claim 15 wherein the density of said dome is approximately twice the density of said base.

17. The burial vault as defined in claim 16 wherein the density of said dome is approximately two pounds per cubic foot and the density of said base is approximately one pound per cubic foot.

18. The burial vault as defined in claim 15 wherein said first predetermined angle is approximately one half degree greater than said second predetermined angle.

19. The burial vault as defined in claim 18 wherein said first predetermined angle is approximately three and one half degrees and said second predetermined angle is approximately three degrees.

20. A burial vault, comprising:

a dome having, in integral relationship, a top, a pair of outwardly inclined spaced-apart side walls and a pair of outwardly inclined spaced-apart end walls, with said top, each of said side walls and each of said end walls each having an interior facing surface which together define a casket receiving hollow; and a base member including a centrally disposed support deck and a pair of ledges extending out away from said deck, said base member having a substantially planar upper surface and a lower surface which includes a first section defining a bottom surface of said deck and second and third sections defining a bottom surface of a respective one of said ledges, and said first section being positioned further from said substantially planar upper surface than said second and third sections, said base member further including a pair of side edges and a pair of end edges extending between the upper and lower surfaces of said base member and forming the outermost periphery of said base member, said base member adapted to slide partially up into the casket receiving hollow of said dome such that the only contact said base member has with said dome is between the interior surface of the end and side walls of said dome and said side edges and said end edges.

21. A burial vault as recited in claim 20 wherein said dome and said base member are formed of a resilient polystyrene material.

22. A burial vault as recited in claim 21 wherein the dome is formed of a polystyrene material which is different in density value than the polystyrene material forming said base member.

23. A burial vault as recited in claim 22 wherein the density of the polystyrene material forming said dome is of a greater density than that of said base.

24. A burial vault as recited in claim 22 wherein said base member is of a density which is approximately half the density of said dome.

25. A burial vault as recited in claim 22 wherein the density of said dome is approximately two pounds per cubic foot and the density of said base member is approximately one pound per cubic foot.

26. A burial vault as recited claim 21 further comprising a plurality of spaced-apart ribs integrally attached to the interior surface of the top of said dome and shaped to conform generally to a casket positioned within said casket receiving hollow.

27. A burial vault as recited in claim 21 wherein the pair of side walls of said dome arc inwardly towards one another to further insure frictional engagement between said base member and said dome.

28. A burial vault as recited in claim 20 wherein the pair of side edges and the pair of end edges of said base member slope inwardly at a first predetermined angle and the pair of end walls and the pair of side walls of said dome slope outwardly at a second predetermined angle with said first predetermined angle being greater than said second predetermined angle.

29. A burial vault as recited in claim 28 wherein said first predetermined angle is greater than said second predetermined angle by at least one half a degree.

30. A burial vault as recited in claim 28 wherein said first predetermined angle is approximately 3.5 degrees and said second predetermined angle is approximately 3 degrees.

31. A burial vault as recited in claim 20 further comprising a plurality of casket-supporting offset ridges projecting upwardly off the substantially planar upper surface of said base member.

32. A burial vault as recited in claim 20 wherein the second and third sections of said base member extend horizontally and in planar fashion outwardly from the centrally disposed support deck to the end edges of said base member.

33. A burial vault as recited in claim 20 wherein said dome and said base member are formed of an expanded polystyrene material.

34. The burial vault as defined in claim 1 wherein said dome includes an internal top surface having a plurality of spaced-apart ribs extending therefrom.

35. The burial vault as defined in claim 34 wherein said plurality of spaced-apart ribs are shaped to conform generally to a casket positioned within the burial vault.

* * * * *